United States Patent
Day et al.

(10) Patent No.: US 8,613,964 B1
(45) Date of Patent: Dec. 24, 2013

(54) METHOD FOR MAKING SHELF-STABLE POI FOOD PRODUCTS FROM DRYLAND AND WETLAND TARO

(75) Inventors: Pamela Day, Kapaau, HI (US); Piikalama Boiser, Kapaau, HI (US)

(73) Assignee: Taro Dream Holdings, LLC, Kamuela, HI (US)

( * ) Notice: Subject to any disclaimer, the term of this patent is extended or adjusted under 35 U.S.C. 154(b) by 394 days.

(21) Appl. No.: 12/502,114

(22) Filed: Jul. 13, 2009

Related U.S. Application Data

(60) Provisional application No. 61/081,092, filed on Jul. 16, 2008.

(51) Int. Cl.
*A23F 3/16* (2006.01)

(52) U.S. Cl.
USPC ............................. 426/52; 426/49; 426/637

(58) Field of Classification Search
USPC ............................................ 426/52, 49, 637
See application file for complete search history.

(56) References Cited

U.S. PATENT DOCUMENTS

| | | | |
|---|---|---|---|
| 2,108,897 A | 2/1938 | Ley et al. | |
| 4,190,965 A | 3/1980 | Erickson | |
| 5,244,689 A * | 9/1993 | Slimak | 426/629 |
| 5,292,511 A | 3/1994 | Kim et al. | |
| 5,480,672 A | 1/1996 | Kusano et al. | |
| 5,798,237 A * | 8/1998 | Picataggio et al. | 435/139 |
| 6,395,315 B1 * | 5/2002 | Matsuura | 426/49 |
| 6,524,631 B1 | 2/2003 | Dicks | |
| 6,753,024 B2 | 6/2004 | Muller et al. | |
| 2005/0153033 A1 * | 7/2005 | Stiles et al. | 426/335 |

OTHER PUBLICATIONS

Allen, O. N., and Allen, E. K., "The Manufacture of Poi from Taro in Hawaii: With Special Emphasis Upon its Fermentation," Hawaii Agricultural Experiment Station, Bulletin No. 70 (1933).*
Nip, W., "Taro Food Products," Proceedings of Taking Taro into the 1990s: A Taro Conference (1989).*
MCD Technologies Brochure, obtained from the Internet Archive as being captured on Jun. 21, 2007.*

* cited by examiner

*Primary Examiner* — Humera Sheikh
*Assistant Examiner* — Jeffrey Mornhinweg
(74) *Attorney, Agent, or Firm* — Lowry Blixseth LLP; Scott M. Lowry

(57) ABSTRACT

A method and composition for making food products for benefiting health, including: inoculating dryland taro poi with fermented wetland taro poi; fermenting the inoculated dryland taro poi; dehydrating the fermented dryland taro poi; rehydrating the dehydrated dryland taro poi; pasteurizing the rehydrated dryland taro poi; reinoculating the pasteurized dryland taro poi with a poi starter culture; and adding nutrients to the reinoculated dryland taro poi. The poi starter culture includes a probiotic organism having a concentration of at least 2000 cfu/g. The nutrients added to the dryland taro poi include one or more selected from the group consisting of: xylose and inulin. The dryland taro poi and the wetland taro poi are in an amount in a ratio of 40:1 by weight, dryland to wetland.

19 Claims, 1 Drawing Sheet

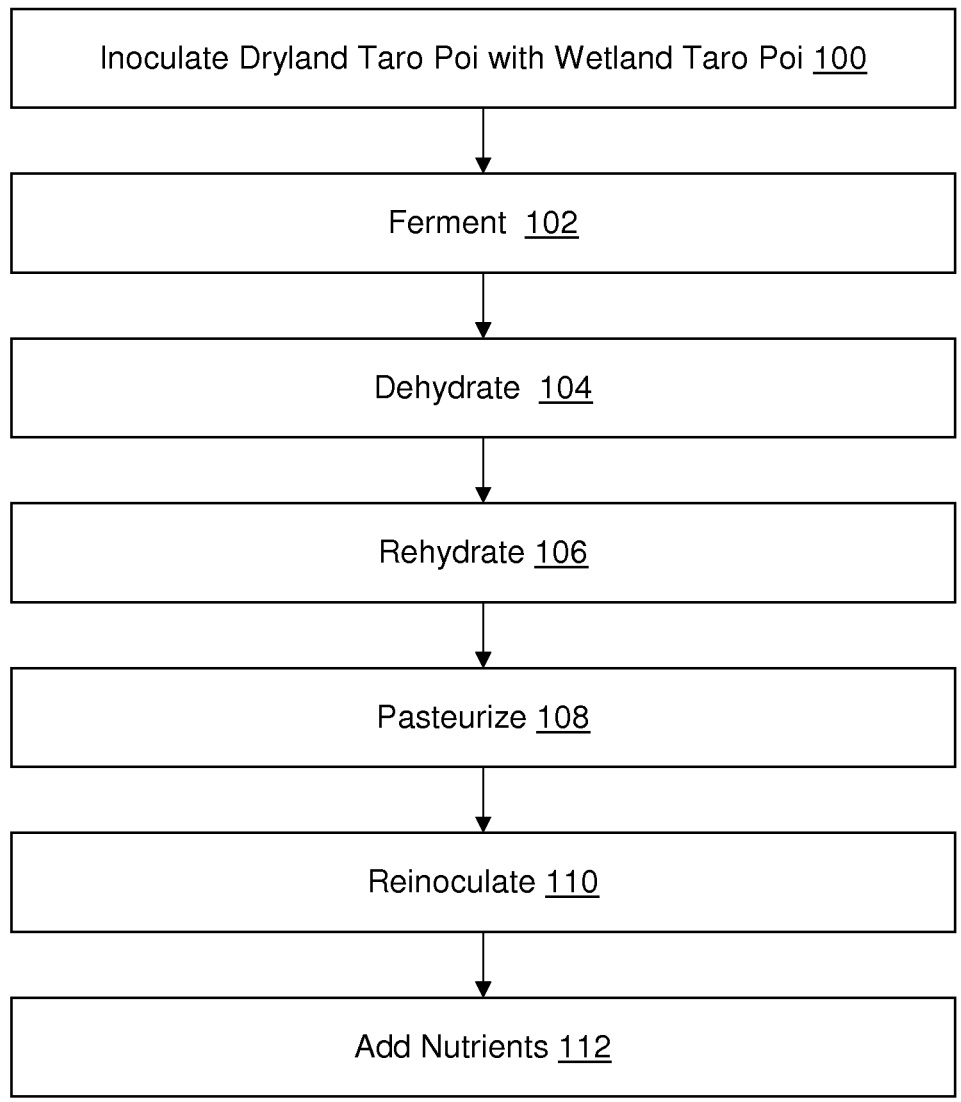

METHOD FOR MAKING SHELF-STABLE POI FOOD PRODUCTS FROM DRYLAND AND WETLAND TARO

BACKGROUND OF THE INVENTION

This application is a nonprovisional application which claims the benefit, under 35 U.S.C. §119, of U.S. Provisional Application No. 61/081,092, filed on 16 Jul. 2008, by Pamela Day, which application is incorporated by reference herein in its entirety.

1. Field of the Invention

The present invention relates to methods and compositions for making food products for benefiting health. Specifically, the present invention relates to methods and compositions for making poi and/or preserving poi and poi-based food products.

2. Description of the Related Art

Taro is an ancient food and was considered the staff of life by the Hawaiian people. For centuries, taro (*Colocasia esculenta*) has been a nutritious staple food for Hawaiians and many other Polynesian peoples throughout the Pacific Rim. For years, Hawaiian's lived primarily on poi (taro mixed with water, mashed to a thick paste-like consistency and fermented), sweet potatoes, fish, seaweed, coconut, green vegetables and fruit. Their diet contained no grains or animal milk.

Cooked taro corm that is blended, mixed with water, and fermented is called "poi". The making of poi is indigenous to Hawaii and is the only place in the world where this ancient practice of food preparation is still found as a mainstream cultural and spiritual experience. Poi is not only considered a significant food but is used for medicinal purposes. Taro is considered the most sacred of all foods, as the ancestry of the Hawaiians is traced back to the taro plant and is thought of as an intimate family member. The use of poi as a staple is believed to have led Captain James Cook and other early western visitors to Hawaii to describe native Hawaiians as being an exceptionally healthy people, characterized by splendid physique and good teeth. Scientific studies have substantiated this observation. Hawaiians consider poi the most sacred of all foods and, through ancient lore, trace their ancestry back to the taro plant which is thought of as an intimate family member.

In Hawaiian culture and around the world, poi can be used as an excellent substitute for dairy, soy, grain and gluten products. The digestibility of taro starch has been estimated to be 98.8 percent and is far superior over other starchy foods. Poi may be successfully consumed by people with food allergies, food sensitivities, autism, celiac disease and various other health conditions that require a hypoallergenic, easily digestible food source. Poi is so digestible that it has commonly been used as an infant food as well as food for premature infants.

Studies have shown that poi is a hypoallergenic, naturally fermented, energy dense, carbohydrate staple that contains heat and acid resistant lactic acid bacteria (LAB). Despite having an acidic pH, which enhances food safety, poi and taro are considered alkaline foods because the alkaline-forming elements (Na, K, Ca, Mg) that are present exceed the acid-forming elements (S, P, Cl). Thus, poi acts as an alkalinizing food in the body rather than an acidifying food. This characteristic helps explain why poi is regarded as a food that can prevent dental caries and why it is highly digestible, and suggests its use in offsetting the tendency toward acidity in advanced cancer patients. Indeed, poi appears to have several properties significant to the decreased risk of carcinogenesis. Poi may be a promising probiotic and/or prebiotic, naturally fermented food.

Foods made with highly allergenic dairy, soy and grain ingredients are widely available to the public. Foods formulated with low-allergenic ingredients, containing hypoallergenic poi and viable poi cultures are non-existent and these could provide a much needed, nutritious and valuable alternatives for those with special dietary needs, especially the high-risk populations of children and the elderly. Additionally, poi and poi-based products may also be more suitable for minority populations than yogurt due to a higher incidence of lactase deficiency among minorities.

Also in comparison, very few food staples exist anywhere in the world that can be considered hypoallergenic, which are rich in calcium, potassium, phosphorus, magnesium, a good source of B vitamins, contain vitamins A and C, minerals, and a small measure of high quality, easily digestible protein. Kalo, or Taro, as it is more commonly known, is not only nutritious, but is considered to be a beneficial carbohydrate food that provides a high fiber, slow-release energy food source.

However, poi is the least stable in its natural state. Traditionally prepared poi has a shelf life of a few days and ferments quickly. One of the greatest challenges to the commercialization of poi and poi-based products is shelf life. Generally poi has a shelf life of three to five days.

Specific requirements for a precise and consistent acid/alkaline balance, microbial control methods and stabilization of poi (to ensure a uniform standard of taste, texture and product safety) are imperative in order to solve manufacturing, distribution and storage challenges. In order to develop a global business model around poi as the main ingredient, poi must be stabilized at some point between farm and finished product. Of the following options: frozen taro corms, frozen cooked taro, frozen poi, and dehydrated poi, nutrient retentive dehydration have been identified as the most nutritious and cost effective. Poi that has been dehydrated properly becomes stable. Shipping to co-packers is cost effective since approximately 98% of the water has been removed. Dehydrated poi can then be stored safely and securely for long periods at room temperature until needed in the final manufacturing process.

Besides an extremely short shelf life of traditionally prepared poi, there is also the potential for inconsistent characteristics and high probability for product failure due to growth of undesirable and dangerous organisms. Accordingly, dehydrated poi does exist but it generally does not contain live poi compounds or substantial beneficial nutrient content due to heat and processing degradation of inferior dehydration and processing methods.

Accordingly, there exists a need for a method and composition for making food products that solves one or more of the problems herein described or that may come to the attention of one skilled in the art after becoming familiar with this specification. For these reasons the invention includes and discloses a process and methodologies that include controlled fermentation, inoculation of specific beneficial bacterial cultures and nutrient retentive dehydration as a means to stabilize the active components within a highly perishable food.

SUMMARY OF THE INVENTION

The present invention has been develop in response to the present state of the art, and in particular, in response to the problems and needs in the art that have not yet been fully solved by currently available food product systems, methods and devices. Accordingly, the present invention has been developed to provide a food product and method of the creation thereof. The invention is also directed to the utilization of probiotic food components to facilitate and increase survival of inoculated bacterial cultures and to benefit health.

In one embodiment of the invention, there may be a method for making food products for benefiting health, which may include the following steps: inoculating dryland taro poi with fermented wetland taro poi, which may thereby create inoculated dryland taro poi; fermenting the inoculated dryland taro poi, which may thereby generate fermented dryland taro poi; dehydrating the fermented dryland taro poi which may suspend fermentation of the inoculated dryland taro poi, and which may thereby generate dehydrated dryland taro poi; rehydrating the dehydrated dryland taro poi which may be by adding fluids such as but not limited to water thereto, which may thereby generate rehydrated dryland taro poi; and/or reinoculating the rehydrated dryland taro poi with a poi starter culture. In another embodiment of the invention the method may further include the step of adding nutrients to the inoculated dryland taro poi which may provide a food source thereto. In still another embodiment of the invention the nutrients added to the inoculated dryland taro poi may include one or more selected from the group of nutrients consisting of: xylose and inulin.

In yet another embodiment of the invention, the method may include the step of pasteurizing the inoculated dryland taro poi which may be by heating the inoculated dryland taro poi, which may thereby generate pasteurized dryland taro poi. In still yet another embodiment of the invention, the poi starter culture may include a probiotic organism. In even another embodiment of the invention, the poi starter culture may include one and/or more selected from the group consisting of: *Lactobacillus plantarum* and/or *Bifidobacterium catenulatum*. In even still another embodiment of the invention, the poi starter culture may include *Lactobacillus pentosus* and/or one or more selected from the group consisting of: *Leuconostoc mesenteroides, Leuconostoc raffinolactis, Lactobacillus brevis, Lactococcus lactis, Lactobacillus plantarum*, and/or *Lactobacillus acidophilus*. In even yet another embodiment of the invention, the organisms of the poi starter culture may have a concentration of at least 2000 cfu/g. In a further embodiment of the invention, the inoculated dryland taro poi may be fermented to a pH of no greater than about 4.4. In a further embodiment of the invention, the inoculated dryland taro poi may be fermented to a pH less than about 7.0.

In an additional embodiment of the invention, there may be a food composition which may have an increased shelf life for benefiting health, which may include: dryland taro poi; wetland taro poi; bacteriocins; a poi starter culture; and/or nutrients. In still an additional embodiment of the invention the dryland taro poi may include a probiotic organism. In yet an additional embodiment of the invention, the wetland taro poi may include a probiotic organism.

In still yet an additional embodiment of the invention, the poi starter culture may include a probiotic organism. In even an additional embodiment of the invention, the poi starter culture may include one and/or more selected from the group consisting of: *Lactobacillus plantarum* and/or *Bifidobacterium catenulatum* and/or other Bifidobacterium species. In even still an additional embodiment of the invention, the poi starter culture may include *Lactobacillus pentosus* and/or one or more selected from the group consisting of: *Leuconostoc mesenteroides, Leuconostoc raffinolactis, Lactobacillus brevis, Lactococcus lactis, Lactobacillus plantarum*, and/or *Lactobacillus acidophilus*

In even yet an additional embodiment of the invention, the organisms of the poi starter cultures may have a concentration of at least 2000 cfu/g. In yet a further embodiment of the invention, the nutrients added to the dryland taro poi may include one or more selected from the group consisting of: xylose and inulin. In still a further embodiment of the invention, the dryland taro poi and/or the wetland taro poi may be in an amount in a ratio of 40:1 by weight, dryland to wetland.

Utilization of controlled fermentation methods to ferment taro into poi is predictable and reliable. Controlled fermentation provides less possibility for product failure and food safety challenges. In addition, the controlled fermentation of taro to poi creates beneficial compounds with known food safety and health benefits. Controlled fermentation methods, the usage of select poi bacteria and other probiotic bacteria as starter cultures, and the addition of prebiotic food components to sustain the poi cultures along with nutrient retentive dehydration, dramatically improves the manufacture of this fermented food to obtain a safe, consistent, standardized and stabilized end product.

Furthermore, poi, using traditional yet controlled methods of fermentation along with select starter cultures, prebiotic food components and nutrient retentive dehydration, (the invention) to increase food safety and health benefits, has the marketing advantage in the quickly growing digestive health niche market as a nutrient dense, hypoallergenic, naturally fermented food for a variety of health conditions. The crucial need to provide low-allergenic, energy-dense, nutritious, probiotic, cultured foods, especially for the vulnerable segments of the population, creates an opportunity to address those needs utilizing poi, an indigenous, traditionally fermented, culturally valuable food staple of the Hawaiian people. Further, the research and use of poi and poi cultures are significant because it provides new plant-based products that may be beneficial when consumed.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWING

In order for the advantages of the invention to be readily understood, a more particular description of the invention briefly described above will be rendered by reference to specific embodiments that are illustrated in the appended drawing. Understanding that this drawing depicts only typical embodiments of the invention and are not, therefore, to be considered to be limiting of its scope, the invention will be described and explained with additional specificity and detail through the use of the accompanying drawing, in which:

FIG. 1 illustrates a block diagram of a method for making food products for benefiting health, according to one embodiment of the invention.

DETAILED DESCRIPTION OF THE INVENTION

For the purposes of promoting an understanding of the principles of the invention, reference will now be made to the exemplary embodiments illustrated in the drawings, and specific language will be used to describe the same. It will, nevertheless, be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Reference throughout this specification to an "embodiment," an "example" or similar language means that a particular feature, structure, characteristic, or combinations thereof described in connection with the embodiment is included in at least one embodiment of the present invention. Thus, appearances of the phrases an "embodiment," an "example," and similar language throughout this specification may, but do not necessarily, all refer to the same embodiment, to different embodiments, or to one or more of the FIGURE. Additionally, reference to the wording "embodiment," "example" or the like, for two or more features, elements, etc. does not mean that the features are necessarily related, dissimilar, the same, etc.

Each statement of an embodiment or example is to be considered independent of any other statement of an embodiment despite any use of similar or identical language characterizing each embodiment. Therefore, where one embodiment is identified as "another embodiment," the identified embodiment is independent of any other embodiments characterized by the language "another embodiment." The features, functions, and the like described herein are considered to be able to be combined in whole or in part one with another as the claims and/or art may direct, either directly or indirectly, implicitly or explicitly.

FIG. 1 illustrates a method for making food products, according to one embodiment of the invention. As shown, the method includes the following steps: inoculate dryland taro poi with wetland taro poi 100, ferment the inoculated dryland taro poi 102, dehydrate the fermented dryland taro poi 104, rehydrate the dehydrated dryland taro poi 106, pasteurize the rehydrated dryland taro poi 108, and reinoculate the pasteurized dryland taro poi 110. Further, the method includes the step of adding nutrients to the reinoculated dryland taro poi 112.

In operation of one embodiment of the invention, dryland taro poi is inoculated with wetland taro poi 100 and fermented 102. Dryland taro poi and wetland taro poi are both made by washing and steaming harvested taro corms, peeling the corms with a mechanized abrasive peeler as well as manually peeling, running the corms through a mechanical grinder, adding water to the corms and regrinding the corms through fine mesh, thereby creating a soft poi product similar to a thick paste. The pH of both dryland and wetland taro poi at processing is generally 5.4 and higher, with dryland taro poi generally having a pH higher than wetland taro poi.

One skilled in the art would understand that dryland taro poi includes poi made from taro grown in soil like other agricultural crops, such as potato or corn. Likewise, one skilled in the art would understand that wetland taro poi includes poi made from taro grown in fields flooded with water, such as by mountain streams. As a result, wetland taro poi generally has much higher counts of soil- and water-based organisms than dryland taro poi, which are used to inoculate the dryland taro poi when combined.

For example, dryland taro poi may be inoculated 100 with wetland taro poi and fermented 102 under controlled circumstances such as, but not limited to, the following example of controlled fermentation: fresh wetland poi is pumped into and held in fermentation tanks at ambient temperature, thereby decreasing the pH of the wetland taro poi to approximately 4.4 or lower. The fermented wetland taro poi with a pH of approximately 4.4 or less is then added to fresh dryland taro poi and pumped into a fermentation tank and held, or stored, there until the pH of the inoculated dryland taro poi is approximately 4.4 or less, or for approximately two days. Natural fermentation as a process consists of transformation of simple raw materials into a range of products by utilizing the phenomenon of growth of microorganisms and/or their activities on various substrates. Beneficially, controlled fermentation utilizes pure starter cultures or culture mediums to initiate and control the natural process of fermentation. In controlled fermentation, pure cultures of single or mixed strains, or species, of microorganisms are used as the starter culture.

Moreover, products from controlled fermentation are consistent and predictable. In controlled fermentation, there is a decreased chance of product failure and pathogenic contamination. The use of a select starter culture, or cultures, helps to control the manufacture of fermented food to obtain the desired identity, purity, and quality of the end product. Also, the inoculation of dryland taro poi with wetland taro poi enables controlled fermentation of the dryland taro poi since dryland taro poi generally lacks significant levels of organisms to ferment on its own because there are fewer organisms in taro grown in soil than there are in taro grown in a wet environment. Accordingly, inoculation of dryland taro poi with wetland taro poi enables safer and more efficient fermentation of the dryland taro poi.

One skilled in the art would understand that food fermentation is a process in which raw materials are converted to fermented foods by the growth and metabolic activities of desirable microorganisms. For example, in one embodiment of the invention, dryland taro poi is inoculated with and fermented by bacteria occurring in wetland taro poi such as, but not limited to: lactic acid producing bacteria including lactobacilli and lactococci, which may be probiotic and may include prebiotic fibers, leuconostocs, and streptococci. Inoculation and fermentation of food, such as poi, creates several beneficial bi-products, such as but not limited to: adenoysl-methionine, antimicrobial peptides, ATP, bacteriocins, beta glucans, biosurfactants, biocytin, biotin, coenzyme A, conjugated linoleic acid (CLA), cysteine, diacetyl, FAD, folic acid, glutathione, GTF chromium, hydrogen peroxide, immune-enhancing peptides, lactic acid, lysozyme, NAD, NADP, pantetheine, peptidoglycans, phosphaditylcholine, phosphaditylethanolamine, phosphaditylinositol, phosphaditylserine, pyridoxal, pyridoxamine, pyridoxamine phosphate, reuterin, teichoic acid, ACE inhibitors, antimutagens, vitamin B1, vitamin B2, vitamin B3, vitamin B5, vitamin B12, and vitamin B13.

Specifically, fermentation of inoculated dryland taro poi creates bacteriocins, which are ribosomally-synthesized antimicrobial peptides produced by some bacteria that are inhibitory to other bacteria. Lactic acid producing bacteria, such as lactobacilli and lactococci, produce bacteriocins that have widespread applications in food preservation by preventing contamination with and growth of food-borne pathogens. Further, DNA from some lactic acid bacteria can reduce inflammation in diseases of the digestive tract such as IBD, Crohn's disease, and other inflammatory intestinal diseases.

Butyrate is another beneficial bi-product of dryland poi inoculation. Butyrate is created as the result of culturing food containing fiber. Butyrate inhibits the growth of cancer causing compounds and may prevent colon cancer. Moreover, fermentation results in improving the digestibility of protein and carbohydrates. For example, dryland taro poi may be inoculated 100 and fermented 102, such as the method for making a food preservative and for preserving food of U.S. Pat. No. 6,753,024, issued to Muller et al., which is incorporated by reference herein. Similarly, dryland taro poi may be fermented 102, such as the baking mixes which contain flour and have an enhanced shelf life and method and means for preparing the same of U.S. Pat. No. 6,524,631, issued to Dicks, which is incorporated by reference herein.

After the dryland taro poi has been inoculated 100 and fermented 102, it is dehydrated 104. Dehydration of the fermented inoculated dryland taro poi suspends the fermentation process, thereby increasing shelf life. Specifically, nutrient retentive dehydration is used to increase shelf life while preserving the benefits of the original food. In one embodiment of the invention the dryland taro poi is dehydrated 104 by spraying or mechanically applying the poi to a moving belt of a dehydrator and heating. In nutrient retentive dehydration, pasteurized dryland taro poi is pumped from a jacketed kettle to a dehydrator where it is applied onto a moving belt that moves through the machine's dehydration chamber and exits in dehydrated format. In another embodiment of the invention, the pH is at about 4.3 to 4.4, and the fermented dryland taro poi is at a concentration of about no less than 14% solids, before beginning dehydration. Alternatively, the poi may be applied to a dehydrator such as the food dehydrator of U.S. Pat. No. 4,190,965, issued to Erickson.

Many drying techniques contribute to the loss of nutrients and other health promoting compounds due to the sensitivity of the nutrients within the food. However, the nutrient retentive dehydration 104 described above uses gentle heat and a low drying time to protect many of the valuable nutrients, as well as lactic acid bacteria, within poi and poi-based food products. In one embodiment of the invention, 94% or more of the nutrients are retained using the window refractance method of dehydration such as, but not limited to, the dehydration method described by www.mcdtechnologiesinc.com, which employs recirculated heated water. Similarly, one skilled in the art would also appreciate that the fermented dryland taro poi may be dehydrated 104 by freeze drying.

The dehydrated dryland taro poi is then rehydrated 106 and may be pasteurized 108 for use as a food product. For example, one skilled in the art would understand that dehydrated dryland taro poi may be rehydrated 106, or reconstituted, adding water, and/or other wet or dry ingredients, such as flavoring, to the dehydrated dryland taro poi. For instance, one skilled in the art would understand that the dryland taro poi may be dehydrated 104 and rehydrated 106 such as the process for making preserved edible foods from root crops of U.S. Pat. No. 5,480,672, issued to Kusano et al., which is incorporated by reference herein. Likewise, one skilled in the art would understand that the dehydrated dryland taro poi may be rehydrated 106 such as the process of making food products of U.S. Pat. No. 2,108,897, issued to Ley et al., which is incorporated by reference herein.

Next, the rehydrated dryland taro poi is pasteurized 108 by heating the rehydrated dryland taro poi to pasteurization temperatures. In one non-limiting example, the rehydrated dryland taro poi is pasteurized 108 by pumping the mixture into a steam kettle with an agitator and heating the mixture of poi, other ingredients, and/or water to temperatures between 170 and 190 degrees Fahrenheit for one to three minutes, and then cooling the mixture to between 60 and 90 degrees Fahrenheit. Advantageously, cooling the mixture enables inoculation of the mixture with poi starter cultures as described below. Additionally, pasteurization minimizes contamination of the poi with organisms such as yeasts, molds, and adverse bacteria.

After pasteurization, the dryland taro poi is reinoculated 110. The dryland taro poi is reinoculated 110 with poi starter cultures, poi cultures, or a starter culture, which may be specialized, or adapted to a particular function or environment. For example, the pasteurized dryland taro poi may be reinoculated 110 with poi starter cultures by adding bacteriocin-producing strains to the pasteurized dryland taro poi, and mixing the reinoculated 110 dryland taro poi to blend thoroughly. For instance, poi starter cultures may include lactic acid bacteria, such as, but not limited to at least 2000 cfu/g of: *Lactobacillus plantarum*; or *Lactobacillus pentosus* and one or more selected from the group consisting of: *Leuconostoc mesenteroides, Leuconostoc raffinolactis, Lactobacillus brevis, Lactococcus lactis, Lactobacillus plantarum, and Lactobacillus acidophilus* and Bifidobacteria species.

Advantageously, one skilled in the art would recognize that lactic acid producing bacteria are probiotic organisms. Organisms are probiotic if when consumed, the organisms augment the microbial balance in the host's gastrointestinal tract. Accordingly, the use of lactic acid bacteria in poi starter cultures is attractive because they enhance nutrition and are powerful immune supporting tools. Further, probiotic organisms, or lactic acid bacteria, produce levels of acid that inhibit the growth of many spoilage organisms and/or potentially dangerous pathogens. Moreover, DNA from probiotic bacteria has been shown to limit epithelial pro-inflammatory responses in vivo and in vitro. For example, one skilled in the art would understand that the dryland taro poi may be reinoculated 112, such as the process for manufacturing a health-supplementary food containing aloe of U.S. Pat. No. 5,292,511, issued to Kim et al., which is incorporated by reference herein.

Generally, food products which are pasteurized, or heat treated, after mixing have an increased shelf life. However, due to sterilization temperatures, these products lack the added benefits provided by probiotic organisms. Advantageously, reinoculation 110 of the dryland taro poi provides these beneficial organisms.

Finally, special nutrients are added to the reinoculated dryland taro poi 112. Special nutrients may be added to the reinoculated dryland taro poi 112 to provide nutrients to the poi starter cultures and prolong poi shelf life. In one non-limiting example, D-xylose and inulin are added to the reinoculated dryland taro poi 112. In another non-limiting example, Yacon, which includes inulin and xylose is added to the reinoculated dryland taro poi 112. However, any compatible material having nutrient value and/or containing D-xylose and/or inulin may be added 112. Beneficially, the poi start cultures metabolize the prebiotic combination of xylose and inulin, rather than the poi, resulting in an extended shelf-life.

Accordingly, a composition prepared by the steps illustrated in FIG. 1 and listed above, include the following: dryland taro poi; wetland taro poi; bacteriocins; a poi starter culture; and nutrients. In one embodiment of the invention, the dryland taro poi and the wetland taro poi are combined in an amount in a ratio of 40:1 by weight, dryland to wetland. Further, dryland taro poi, the wetland taro poi, and the poi starter culture may each include a probiotic organism, respectively, such as a lactic acid producing bacteria or *Bifidobacterium catenulatum*. For instance, dryland taro poi, the wetland taro poi, and/or the poi starter culture may include lactic acid bacteria, such as, but not limited to at least 2000 cfu/g of: *Lactobacillus plantarum*; or *Lactobacillus pentosus* and one or more selected from the group consisting of: *Leuconostoc mesenteroides, Leuconostoc raffinolactis, Lactobacillus brevis, Lactococcus lactis, Lactobacillus plantarum*, and *Lactobacillus acidophilus*.

Advantageously, a composition prepared according to the method above has a greatly increased shelf-life. For instance, poi which undergoes this process may be stable for up to 60 days or more. Also advantageously, this process enables the survival of beneficial microorganisms, while inhibiting the growth of organisms which may have a pathogenic effect, thereby preventing contamination of the food product and benefiting health.

In order to demonstrate the practice of the present invention, the following examples have been prepared. The examples should not, however, be viewed as limiting the scope of the invention.

Example 1: 50 Gallons of Pineapple Coconut Poi

| STEPS | PROCESS | WEIGHT | LBS |
|---|---|---|---|
| 1 | Add water | 200.00 | Lbs. |
| 2 | Add tapioca syrup | 52.96 | Lbs. |
| 3 | Add pineapple through hopper and run though mill | 77.00 | Lbs. |
| 4 | Add: | | |
|  | Banana puree | 4.76 | Lbs. |
|  | Coconut cream | 44.00 | Lbs. |
|  | Blend entire mix | | |
| 5 | Add poi and blend | 12.12 | Lbs. |
| 6 | Add all other dry ingredients slowly | | |
|  | D-xylose | 8.03 | Lbs. |
|  | Inulin | 6.02 | Lbs. |
|  | HM pectin gum | 0.70 | Lbs. |
|  | DS-101 gum | 2.75 | Lbs. |
| 7 | Blend enough to hydrate dry ingredients | | |
| 8 | Add coconut oil | 3.92 | Lbs. |
| 9 | Add annatto tumeric color | 25.00 | Grams |
| 10 | Add flavors | | |
|  | Vanilla | 3.22 | Lbs. |
|  | Mixed fruit flavor | 1.07 | Oz. |
| 11 | Blend to creamy texture | | |
| 12 | Heat to 175° F. and hold 3 minutes | | |
| 13 | Cool to 60° F. while mixing | | |
| 14 | Add 2 vials of poi culture and mix well | | |
| 15 | Run through mill and pump to filter | | |
| 16 | Fill 8 oz. containers | | |
| 17 | Pack and chill | | |
|  | Total Weight: | 415.48 | Lbs. |

Example 2: 50 Gallons of Tropical Cocoa Poi

| STEPS | PROCESS | WEIGHT | LBS |
|---|---|---|---|
| 1 | Add water | 227.28 | Lbs. |
| 2 | Add tapioca syrup and blend well | 132.28 | Lbs. |
| 3 | Add poi-blend | 22.94 | Lbs. |

Example 2: 50 Gallons of Tropical Cocoa Poi -continued

| STEPS | PROCESS | WEIGHT | LBS |
|---|---|---|---|
| 4 | Add all dry ingredients | | |
|  | Cocoa powder | 10.45 | Lbs. |
|  | Inulin | 6.27 | Lbs. |
|  | D-xylose | 8.36 | Lbs. |
|  | HM pectin gum | 0.45 | Lbs. |
|  | DS-101 gum | 0.68 | Lbs. |
| 5 | Blend to hydrate and run through mill | | |
| 6 | Add coconut oil | 2.65 | Lbs. |
| 7 | Add flavors | | |
|  | Vanilla | 4.16 | Lbs. |
|  | Chocolate | 1.25 | Lbs. |
| 8 | Blend to creamy texture | | |
| 9 | Heat to 190° F. and hold 1 minute | | |
| 10 | Cool to 60° F. and mix well | | |
| 11 | Add 2 vials of Plantarum culture and mix well | | |
| 12 | Run through mill and pump to filter | | |
| 13 | Fill 8 oz. containers | | |
| 14 | Pack and chill | | |
|  | Total weight: | 416.77 | Lbs. |

Example 3

Sixty-Three Day Analysis of Product Life

During the shelf life study two inoculated bacteria cultures within processed poi product processed according to the method of the invention were found to survive for 63 days and increased in concentration an additional 2 logs CFU/g from the starting bacterial concentrations. Data suggests that by adding xylose and inulin based nutrients, the poi-based products are able to support the viability and subsequent growth of the added lactic acid bacteria cultures for extended shelf life.

Initially, the poi product according to the method of the invention was inoculated with probiotic *Lactobacillus pentosus* and *Lactobacillus plantarum* at a level of approximately $10^5$ CFU/g to create different varieties. In addition, several varieties of the product received inulin and/or xylose based nutrients in an amount of 2 grams of inulin per 8 ounces of product according to the method of the invention. The probiotic organism concentrations of the product varieties were stored at 4° C. and sampled initially and at days 7, 14, 21, 28, 35, 42, 49, 56, and 63. Growth to concentrations of approximately $10^6$-$10^7$ CFU/g occurred between day 7 and day 14, and these concentrations were maintained until day 63. Further, after 63 days, the approximate concentration of the probiotic was maintained regardless of whether one probiotic was added or whether a combination of *Lactobacillus pentosus* and *Lactobacillus plantarum* was added to the product. Accordingly, the method and composition of this invention provides a 63+ day shelf life for poi-based products versus traditional commercial poi which has a shelf life of only 3-6 days.

It is understood that the above-described preferred embodiments are only illustrative of the application of the principles of the present invention. The present invention may be embodied in other specific forms without departing from its spirit or essential characteristics. The described embodiment is to be considered in all respects only as illustrative and not restrictive. The scope of the invention is, therefore, indicated by the appended claim rather than by the foregoing description. All changes which come within the meaning and range of equivalency of the claims are to be embraced within their scope.

For example, although the FIGURE illustrate the use of dryland taro poi, it is expected that the process and composition may be completed by substituting the dryland taro poi with wetland taro poi. Similarly, it is envisioned that the process may be used for non-poi food products, such as any root or starch appreciated in the art, such as, but not limited to potato. Moreover, it is expected that the poi starter cultures of the process and composition may be used for non-poi food products, such as cultures for soy and dairy, such as, but not limited to yogurt.

Additionally, it is envisioned that other ingredients may be added to the mixture, such as, but not limited to: nutritional supplements, such as vitamins; flavoring; coloring; antioxidants, such as tropical fruit; and/or other low allergenic ingredients. Finally, it is envisioned that the process may include the step of preparing a poi culture medium for growing the poi starter cultures. For instance, the poi culture medium may be meat-based, lactose-based, plant-based, and/or poi-based.

Finally one skilled in the art would understand that the dryland taro poi may be inoculated 100 with any taro poi culture appreciated in the art. For example, one skilled in the art would understand that dryland taro poi may be inoculated 100 with taro poi such as, but not limited to: wetland taro poi cultures, frozen poi cultures, and dehydrated poi cultures. Similarly, one skilled in the art would understand that the dryland taro poi may be inoculated 100 or reinoculated 112 with non-poi cultures, such as, but not limited to cultures containing lactic acid producing bacteria and/or *Bifidobacterium catenulatum*.

Thus, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims. Further, it is contemplated that an embodiment may be limited to consist of, or to consist essentially of, one or more of the functions, features, structures, and/or methods described herein.

What is claimed is:

1. A method for making a shelf stable poi-based food product, comprising the following steps:
   cooking dryland taro corm, thereby creating inoculated dryland taro corm;
   forming unfermented inoculated dryland taro poi from the inoculated dryland taro corm;
   fermenting the unfermented inoculated dryland taro poi with approximately 2.5% by weight of fermented wetland taro poi, the fermented wetland taro poi fermenting the dryland taro poi to form a taro poi mixture having naturally occurring poi cultures;
   dehydrating the taro poi mixture to suspend fermentation;
   rehydrating the dehydrated taro poi mixture; and
   reinoculating the rehydrated taro poi mixture with a poi starter culture into a poi-based food product having a shelf-life of at least 60 days.

2. The method of claim 1, further comprising the step of adding nutrients to the inoculated dryland taro poi to provide a food source thereto.

3. The method of claim 2, wherein the nutrients added to the inoculated dryland taro poi include one or more selected from the group consisting of: xylose and inulin.

4. The method of claim 1, further comprising the step of pasteurizing the inoculated dryland taro poi by heating the inoculated dryland taro poi, thereby generating pasteurized dryland taro poi.

5. The method of claim 1, wherein the poi starter culture includes a probiotic organism.

6. The method of claim 5, wherein the poi starter culture includes one or more selected from the group consisting of: *Lactobacillus plantarum* and *Bifidobacterium catenulatum*.

7. The method of claim 5, wherein the poi starter culture includes *Lactobacillus pentosus* and one or more selected from the group consisting of: *Leuconostoc mesenteroides, Leuconostoc raffinolactis, Lactobacillus brevis, Lactococcus lactis, Lactobacillus plantarum*, and *Lactobacillus acidophilus*.

8. The method of claim 1, wherein the organisms of the poi starter cultures have a concentration of at least 2000 cfu/g.

9. The method of claim 1, wherein the inoculated dryland taro poi is fermented to a pH of no greater than about 4.4.

10. A window refractance dehydrated food composition having a naturally preservative-free natural nutrient retention rate of at least 90% with a shelf life of at least 60 days, comprising:
    dryland taro poi inoculated with natural poi cultures from wetland taro;
    wetland taro poi of approximately 2.5% by weight of the dryland taro poi;
    fermentation metabolites;
    a poi starter culture; and
    nutrients.

11. The food composition of claim 10, wherein the dryland taro poi and the wetland taro poi includes a probiotic organism.

12. The food composition of claim 10, wherein the poi starter culture includes a probiotic organism.

13. The food composition of claim 12, wherein the poi starter culture includes one or more selected from the group consisting of: *Lactobacillus plantarum* and *Bifidobacterium catenulatum*.

14. The food composition of claim 13, wherein the poi starter culture includes *Lactobacillus pentosus* and one or more selected from the group consisting of: *Leuconostoc mesenteroides, Leuconostoc raffinolactis, Lactobacillus brevis, Lactococcus lactis, Lactobacillus plantarum*, and *Lactobacillus acidophilus*.

15. The food composition of claim 10, wherein the organisms of the poi starter culture have a concentration of at least 2000 cfu/g.

16. The food composition of claim 10, wherein the nutrients added to the dryland taro poi include one or more selected from the group consisting of: xylose and inulin.

17. A method for making a shelf-stable poi-based food product, comprising the following steps:
    cooking fresh unpeeled dryland taro corm, thereby creating inoculated fresh dryland taro corm;
    forming unfermented inoculated fresh dryland taro poi from the inoculated fresh dryland taro corm;
    fermenting the unfermented inoculated fresh dryland taro poi with approximately 2.5% by weight of fermented wetland taro poi, the fermented taro poi fermenting the dryland taro poi to form a taro poi mixture having naturally occurring poi cultures;
    dehydrating the taro poi mixture by window refractance to suspend fermentation of the taro poi mixture with a nutrient retention content of at least 90%;
    rehydrating the dehydrated taro poi mixture;

pasteurizing the rehydrated taro poi mixture by heating the rehydrated taro poi mixture;

reinoculating the pasteurized taro poi mixture with a poi starter culture; and adding nutrients to the reinoculated taro poi mixture to provide a naturally preservative-free poi-based food product having a shelf-life of at least 60 days.

18. The method of claim 17, wherein the poi starter culture includes a probiotic organism having a concentration of at least 2000 cfu/g.

19. The method of claim 17, wherein the nutrient retention content is in the range of 94%-96%.

\* \* \* \* \*